(12) United States Patent
Cristofori et al.

(10) Patent No.: US 11,225,981 B2
(45) Date of Patent: Jan. 18, 2022

(54) VEHICLE WITH A BOOM COMPRISING A HYDRAULIC CONTROL CIRCUIT WITH A LOAD CONTROL VALVE

(71) Applicant: CNH INDUSTRIAL AMERICA LLC, New Holland, PA (US)

(72) Inventors: Davide Cristofori, Castenaso (IT); Giovanni Notarnicola, Putignano (IT); Alessandro Benevelli, Albinea (IT)

(73) Assignee: CNH Industrial America LLC, New Holland, PA (US)

( * ) Notice: Subject to any disclaimer, the term of this patent is extended or adjusted under 35 U.S.C. 154(b) by 247 days.

(21) Appl. No.: 16/610,828

(22) PCT Filed: May 2, 2018

(86) PCT No.: PCT/EP2018/061107
§ 371 (c)(1),
(2) Date: Nov. 4, 2019

(87) PCT Pub. No.: WO2018/202659
PCT Pub. Date: Nov. 8, 2018

(65) Prior Publication Data
US 2021/0156401 A1    May 27, 2021

(30) Foreign Application Priority Data
May 3, 2017    (IT) .................. 102017000047745

(51) Int. Cl.
*F15B 15/00*    (2006.01)
*F15B 1/02*     (2006.01)
*G05B 15/02*    (2006.01)

(52) U.S. Cl.
CPC .............. *F15B 1/021* (2013.01); *F15B 15/00* (2013.01); *G05B 15/02* (2013.01)

(58) Field of Classification Search
CPC ...... F15B 1/021; F15B 15/00; F15B 13/0416; F15B 13/0422; F15B 13/0426; F15B 13/0448
See application file for complete search history.

(56) References Cited

U.S. PATENT DOCUMENTS

| 7,448,309 B2 | 11/2008 | Bitter |
| 10,683,879 B1* | 6/2020 | Zahe ................. F15B 13/023 |
| 2007/0056280 A1* | 3/2007 | Bitter ............... F15B 11/003 60/468 |

FOREIGN PATENT DOCUMENTS

| DE | 19800721 A1 | 7/1999 |
| DE | 102012220863 A1 | 5/2014 |

(Continued)

OTHER PUBLICATIONS

International Search Report and Written Opinion for Application No. PCT/EP2018/061107 dated Jul. 10, 2018 (11 pages).

*Primary Examiner* — Abiy Teka
*Assistant Examiner* — Daniel S Collins
(74) *Attorney, Agent, or Firm* — Peter Zacharias; Patrick Sheldrake

(57) ABSTRACT

A vehicle including a control valve to lift and lower a boom. The vehicle further includes a control circuit to control a speed of the boom lowering via a pressure compensator that balances a first pressure signal downstream of a control valve during the boom lowering and a second pressure signal from a hydraulic user interface so that, upon increasing of the first pressure signal during the boom lowering, the control valve progressively closes.

9 Claims, 3 Drawing Sheets

(56) References Cited

FOREIGN PATENT DOCUMENTS

| | | |
|---|---|---|
| DE | 102013206973 A1 | 10/2014 |
| EP | 1897847 A2 | 3/2008 |
| EP | 2196682 A1 | 6/2010 |
| EP | 2189666 B1 | 7/2011 |
| EP | 1915538 B1 | 4/2012 |
| EP | 2786959 A1 | 10/2014 |
| JP | 2000095493 A | 4/2000 |

\* cited by examiner

VEHICLE WITH A BOOM COMPRISING A HYDRAULIC CONTROL CIRCUIT WITH A LOAD CONTROL VALVE

The present invention relates to a terrestrial vehicle with a boom comprising a hydraulic control circuit, e.g. a telehandler.

BACKGROUND OF THE INVENTION

Normally the boom of a vehicle is lifted via a hydraulic linear actuator and is lowered taking advantage of gravity applied to the boom itself or to a load carried by the boom. According to a known approach, the lowering speed of the boom depends on the mass of the load carried by the boom. In particular, the higher the load, the higher the lowering speed given the same position of a distributor valve controlled by a user of the vehicle via, e.g. a joystick. Therefore, in case of high load, the user shall control the distributor valve to increase the hydraulic resistance in order to decrease the boom lowering speed. Furthermore, where a high load is carried by the boom, a relatively small correction on the distributor valve may cause a relatively high change in lowering speed because the control circuit becomes more sensible to the commands by the user. This poses safety issues.

SUMMARY OF THE INVENTION

It is the scope of the present invention to provide a vehicle with a boom having a hydraulic control circuit that provides a safe control of the boom lowering speed, preferably a control such that the lowering speed is related to a command by the user with little or no impact by the load carried on the boom.

The scope of the present invention is achieved by providing a control valve intercepting fluid flow during boom lowering, a fluid piloting line connected to a user interface for piloting the control valve when the boom lowers by gravity, wherein a pressure compensator is piloted by a first pressure signal from the fluid line downstream of the control valve and by a second pressure signal from the fluid piloting line so that, upon increasing of the first pressure signal during boom lowering by gravity, a branch of the piloting line is progressively connected to the tank for causing the control valve to progressively close and, thus, increase hydraulic resistance applied to the flow when the boom lowers.

This is advantageous because lowering speed becomes independent from the load carried by the boom and, in addition, pressure compensator is balanced at a relatively low pressure level during boom lowering by gravity. Therefore, the control circuit is simpler and more cost effective.

Preferred alternatives are disclosed in the dependent claims.

BRIEF DESCRIPTION OF THE DRAWINGS

For a better understanding of the present invention, the latter will further be disclosed with reference to the accompanying figures in which.

DETAILED DESCRIPTION OF THE DRAWINGS

Figure 1:
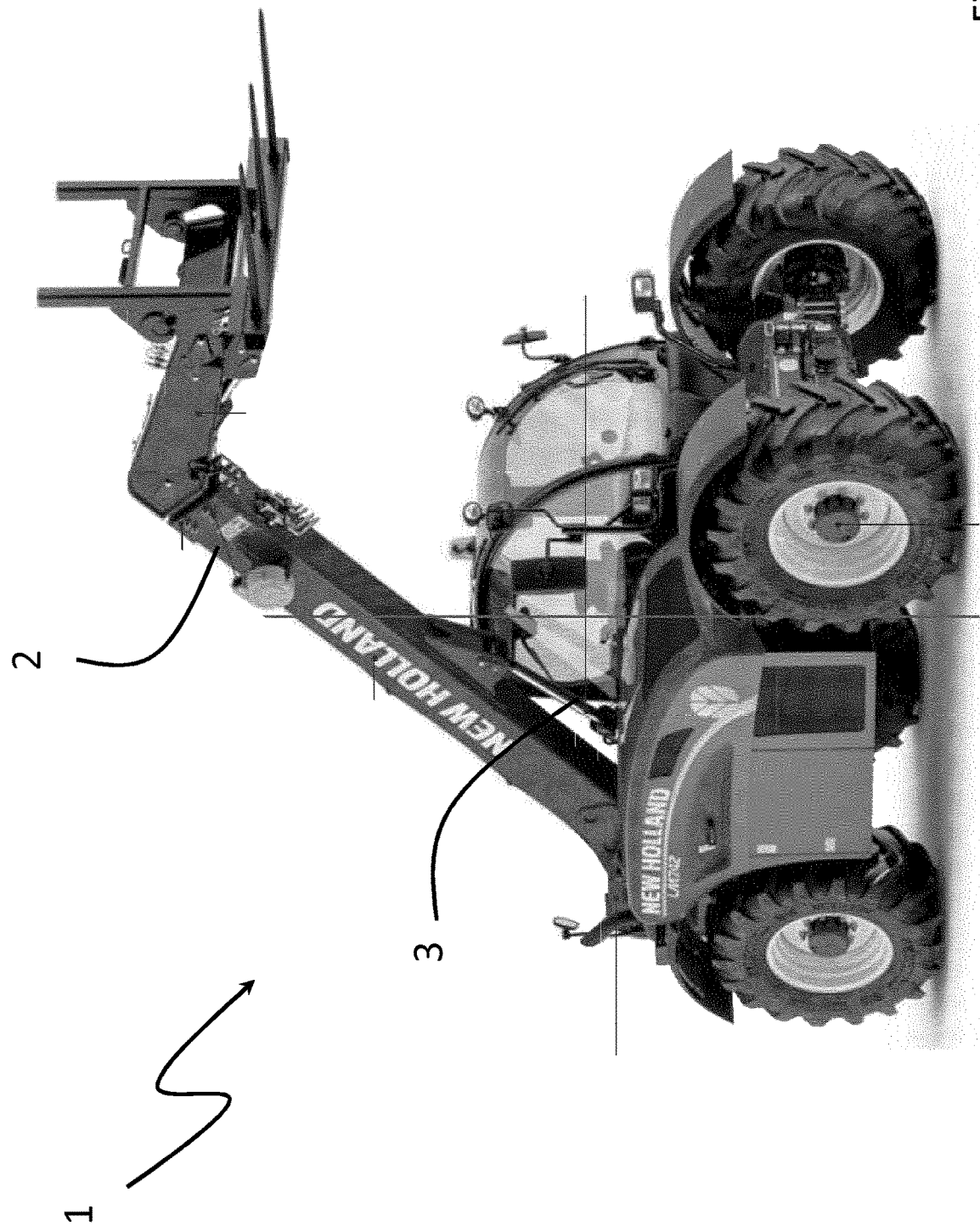
FIG. 1 shows a vehicle comprising a boom and a control circuit according to the present invention.

FIG. 1 refers, as a whole, to a vehicle 1, in particular a telehandler, comprising a boom 2 and a linear hydraulic actuator 3 to lift/lower boom 2.

Figure 2:
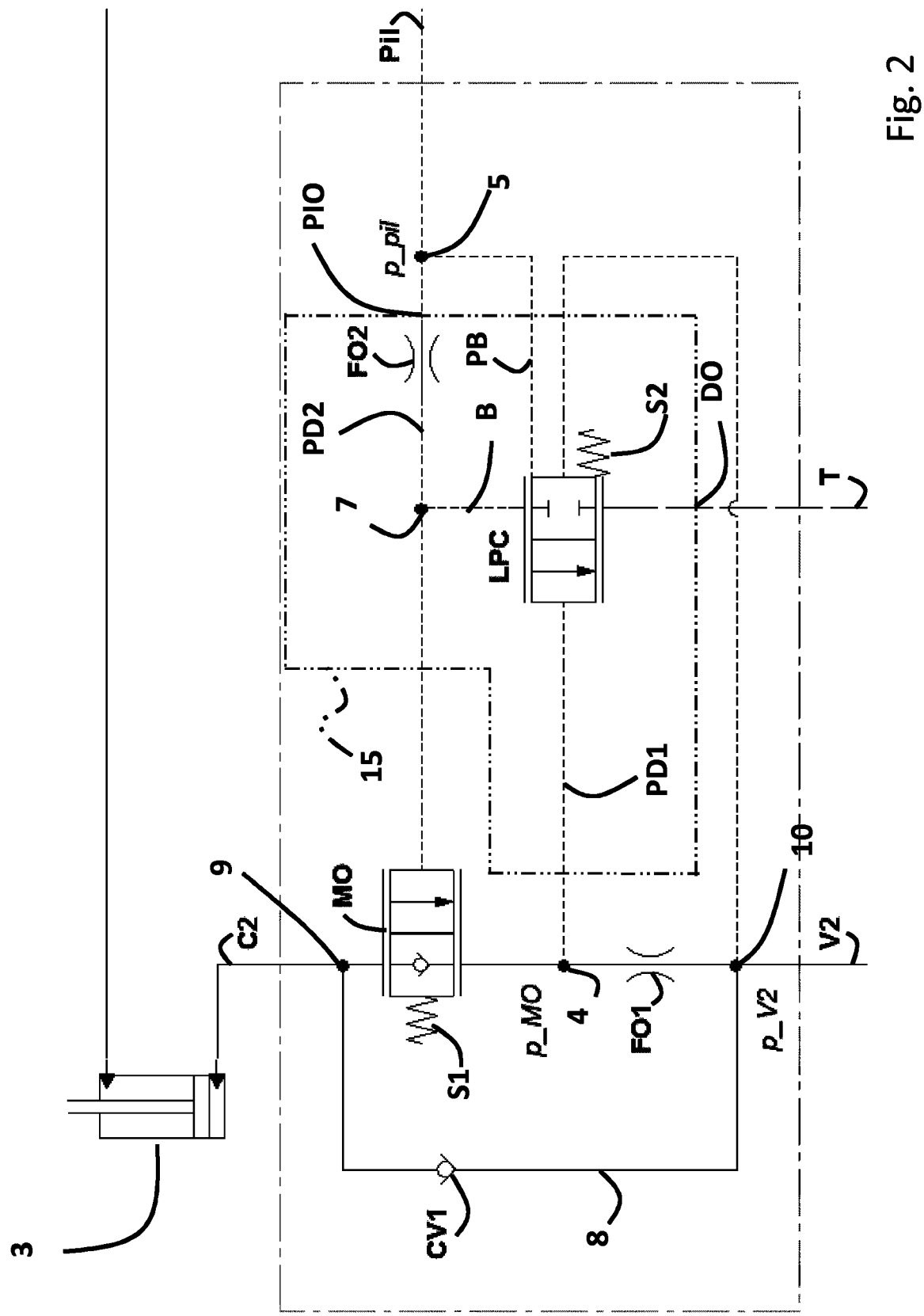
FIG. 2 is a hydraulic control circuit according to the present invention.

FIG. 2 shows a hydraulic control circuit comprising a power control valve MO intercepting a fluid flow along a cylinder line C2 from actuator 3 when boom 2 lowers by gravity and a pressure compensator LPC to elaborate a piloting pressure signal for power control valve MO. In particular, pressure compensator LPC regulates to deliver a piloting fluid flow to a tank or a discharge line and is continuously balanced by pressure signals as will be described below.

Power control valve MO is kept in a normally closed position by a spring S1. In such a closed position, hydraulic fluid cannot be discharged from the cylinder chamber of actuator 3 so that boom 2 keeps a fixed vertical position in an energy saving mode. Preferably, power control valve 3 has a leakage-proof one-way closed position. For example, power control valve 3 is a poppet valve piloted to continuously switch towards a fully open position. In the one-way closed position, power control valve MO blocks a flow from the cylinder side of linear actuator 3 and lets a flow across control valve MO towards linear actuator 3.

Downstream of power control valve MO considering a fluid flow during lowering of boom 2, a junction 4 delivers a cylinder side pressure signal p_MO to pressure compensator LPC.

A hydraulic user interface, e.g. a hydraulic joystick or the like, is connected to power control valve MO by a piloting line Pil from which, via a junction 5, a piloting pressure signal p_pil is branched off.

The balance between downstream pressure signal p_MO and piloting pressure signal p_pil controls the position of pressure compensator LPC.

The latter is normally in a closed position due to a spring S2 and progressively connects a branch B from piloting line Pil to a discharge line T. According to an important aspect of the present invention, pressure between junction 5 and a junction 7 of branch B is decoupled via a flow restrictor F02 along piloting line Pil. Pressure decoupling between junction 5 and junction 7 can be alternatively obtained via a number of structural solutions, e.g. including one or more orifices between junctions 5 and 7 or other embodiments of a lumped pressure drop. Furthermore, the relevant pressure drop to decouple pressure in junction 5 from pressure in junction 7 may also be obtained via a continuously distributed pressure drop along a sufficiently and/or narrow long pipe.

In use, during lowering by gravity of boom 2, a user generates a pressure signal to open power control valve MO via piloting line Pil and fluid flow is discharged across valve MO. Hence, lowering by gravity is controlled by the user via the joystick and valve MO provides a lumped pressure drop to the hydraulic flow generated by the action of gravity on boom 2. In case of high load carried by boom 2, cylinder side signal p_MO increases and tends to open pressure compensator LPC against the action of piloting pressure signal p_pil and spring S2. This progressively connects branch B to discharge line T so that pressure acting against spring S1 decreases, causing power control valve MO to progressively close until a new equilibrium is reached. Due to progressive closure of power control valve MO, lowering speed of boom 2 decreases.

When boom 2 shall be lifted, a hydraulic fluid flow generated by a not-shown hydraulic power source flows across power control valve MO into linear actuator 3, valve MO being in the closed one-way position.

The control circuit according to FIG. 2 is further improved in view of the following additional and non limiting features.

In order to increase energy efficiency of a boom lifting operation in view of pressure drop across power control valve MO, control circuit may comprise a feed branch 8 having a check valve CV1 closed to stop fluid flow when boom 2 lowers by gravity. In particular, check valve CV1 is in parallel to power control valve MO with respect to a cylinder side of actuator 3 via a node 9.

Check valve CV1 is also in parallel to node 4. A line V2 is connected to both feed branch 8 and power control valve MO via a node 10. In particular, line V2 is the prosecution of cylinder line C2 and, where available, feed branch 8 for connection to a non illustrated hydraulic power source.

In use, to enable the boom lifting operation, a flow from the not-shown hydraulic power source bypasses power control valve MO via node 10 and feed branch 8. Such flow crosses check valve CV1 and, via node 9, feeds linear actuator 3. The one-way closed position of power control valve MO ensures that no leakage occurs and the flow from branch 8 fully feeds linear actuator 3. Furthermore, during boom lifting, higher pressure drop across power control valve MO with respect to that across check valve CV1 ensures that feed flow is directed to feed branch 8.

In case of still lifted boom position, check valve CV1 and one-way closed positon of power control valve MO ensure that there is no leakage so that hydraulic fluid is trapped inside linear actuator 3. Therefore, the position is kept in an energy efficient way with minimum or null hydraulic power loss.

In case of lowering by gravity of boom 2, opening of power control valve MO triggers the pressure compensation already described in the previous paragraph and check valve CV1 ensures that flow pumped out of linear actuator 3 fully flows through power control valve MO.

In order to decrease the size of spring S2, an additional pressure signal is provided together with the action of piloting pressure signal p_pil to balance cylinder side signal. Preferably, a line pressure signal p_V2 is branched from line V2 via a node. Node 4 and node 10 are such that there is a pre-set pressure drop. Such pressure drop may be realized in many ways, including the provision of a sector having a predefined length or the provision of a flow restrictor F01. According to the preferred embodiment of FIG. 2, node 10 connects both feed branch 8 and pressure compensator LPC to line V2.

In use, during boom lowering by gravity, pressure drop between nodes 4 and 10, preferably due to flow restrictor F01, provides that pressure at node 4 is higher than that at node 10. Indeed the latter is connected to a tank or otherwise drained.

Impact on spring S2 is apparent during boom lifting. Indeed, in such a condition, pressure at node 10 is higher than that at node 4. Furthermore, pressure in nodes 4, 10 during boom lifting is in the range of a few hundred bars. Line pressure signal p_V2 compensates cylinder side signal p_MO so that pressure compensator LPC is kept in a closed position by the action of spring S2, the latter providing a load equivalent to a few bars. In case line pressure signal p_V2 is not present, the load of spring S2 is equivalent to the pressure range for lifting boom 2, e.g. a few hundred bars. Furthermore, line pressure signal p_V2 acts concordantly with piloting pressure signal p_pil.

Figure 3:
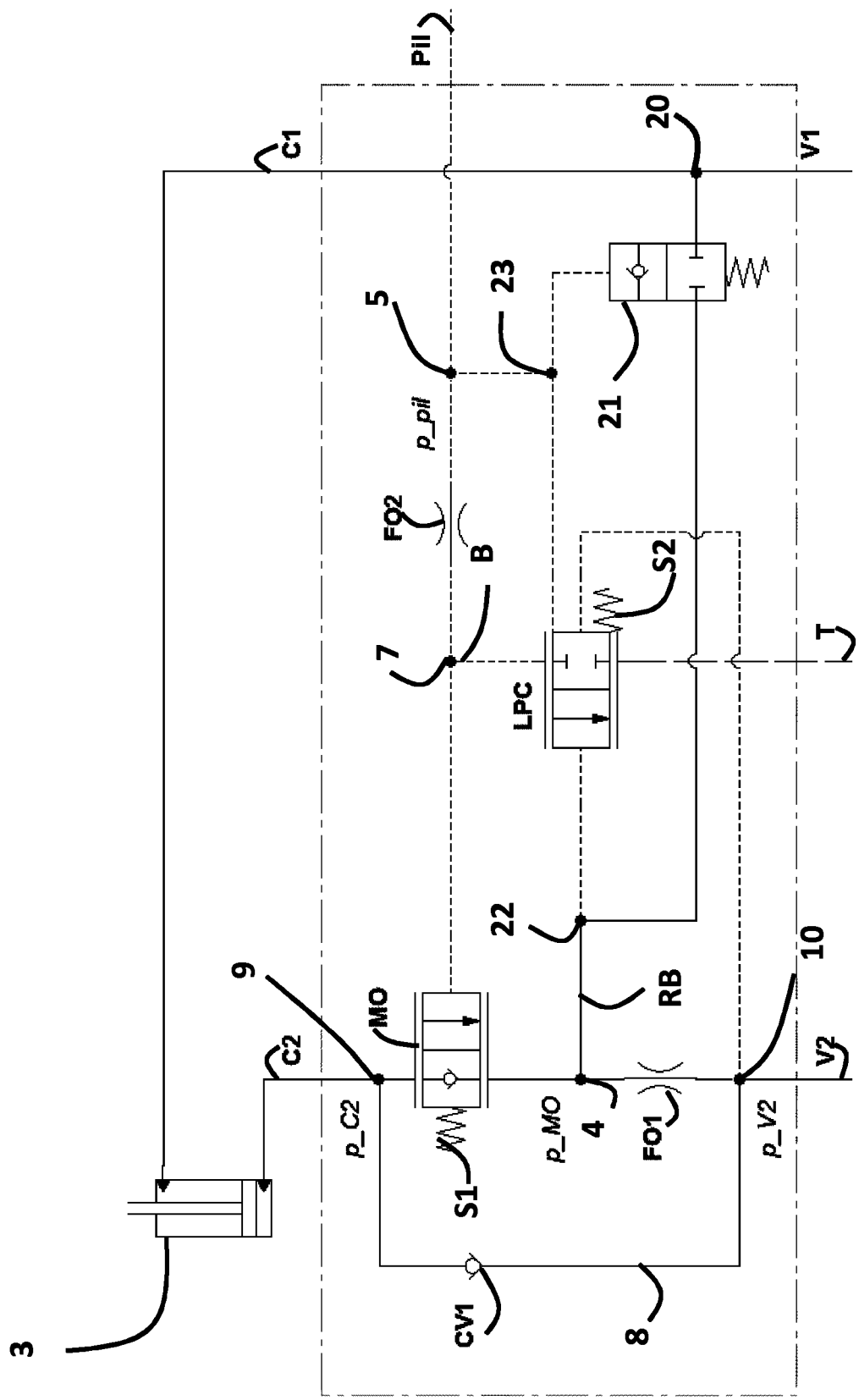
FIG. 3 is a hydraulic control circuit according to a further embodiment of the present invention.

FIG. 3 shows a schematic control circuit where elements functionally identical to those described in the previous paragraphs share the same reference numbers.

The circuit of FIG. 3 differs from that of FIG. 2 as follows.

A piston side of linear actuator 3 is connected to a piston line C1 for flow regeneration. In particular, node 4 is connected by a regeneration bridge RB to a node 20 of piston line C1. Regeneration bridge RB is intercepted by a control valve 21, which can be a piloted check valve, i.e. a discrete valve.

Cylinder side signal p_MO branches from regeneration bridge RB via a node 22. Furthermore, opening of control valve 21 is piloted by a regeneration piloting pressure signal branched from piloting pressure single p_pil via a node 23.

According to the invention, some of the functions and/or components discussed above are grouped in a single hydraulic unit 15. In particular, such unit comprises a body having at least:

A first piloting duct PD1 for connection to cylinder line C2 via node 4;

A piloting input opening PIO to receive piloting pressure signal p_pil;

A second piloting duct PD2 to control the opening of power control valve MO and connected to piloting input opening PIO;

pressure compensator LPC to connect branch B from the second piloting duct PD2 to a discharge opening DO;

a piloting branch PB suitable for branching from the second piloting duct PD2 upstream of branch B, wherein the pressure compensator LPC is connected to the first piloting duct PD1 and to the piloting branch PB such to progressively open and connect branch B to the discharge opening DO upon increasing of the cylinder side pressure signal p_MO.

The control circuit according to the present invention can be also implemented as a retrofit upgrade on an existing vehicle. In particular, during retrofitting, the following steps are performed:

Providing pressure compensator LPC to discharge the fluid piloting line Pil;

the compensator LPC being connectable to:

a first pressure signal p_MO of the fluid line C2 from downstream of control valve MO; and a second pressure signal p_pil from the fluid piloting line Pil; so that the compensator LPC progressively opens and connects branch B of the piloting line Pil to the tank upon increasing of the cylinder side pressure signal p_MO.

Furthermore, it is clear that it is possible to modify the vehicle hereby described without departing from the scope of protection as defined by the appended claims.

For instance, valve unit 15 may be a fully functional hydraulic block attached directly to linear actuator 3 in order to avoid that a potential failure of a hose connecting actuator 3 and power control valve MO may cause boom 2 to unexpectedly fall and cause major damages. To this regard, such block may also comprise at least power control valve MO and nodes 4 and 5: this ensures that the essential elements for functioning are embodied in the block.

As additional alternatives, the block may comprise feed branch 8, nodes 9 and 10 and check valve CV1 and/or second flow restrictor F01 and a duct to provide line pressure signal p_V2. When both of such alternatives are present, the block includes all the elements delimited by dash-dot line in FIG. 2.

Relating to the embodiment in FIG. 3, the block may additionally comprise valve 21 and nodes 22, 23, including regeneration bridge RB. In such a configuration, all elements delimited by dash-dot line are included in the block.

According to the embodiments of an hydraulic block embodying the features inside dash-dot line in FIGS. 2 and 3, such block is fully functional and is ready for attachment to standard lines or ports of actuator 3 and a hydraulic piloting line Pil to obtain a safer control of boom 2 with little, if any, additional work.

The invention claimed is:

1. A working vehicle comprising:
a lifting boom;
a fluid line to deliver hydraulic fluid to a tank when the boom lowers;
a control valve intercepting the fluid line;
a fluid piloting line connected to a user interface for piloting the control valve when the boom lowers; and
a pressure compensator piloted by a first pressure signal branched from the fluid line at the low pressure side of the control valve when lowering the lifting boom and by a second pressure signal from the fluid piloting line so that, upon increasing of the first pressure signal during boom lowering, a branch of the piloting line is progressively connected to the tank for causing the control valve to progressively close, the pressure of the branch being decoupled from the pressure of the second pressure signal.

2. The working vehicle according to claim 1, wherein a flow restrictor is located along the piloting line to decouple the pressure of the branch and the pressure of the second pressure signal.

3. The working vehicle according to claim 1, in which a feed branch bypasses the power control valve and joins the fluid line in a first node between an actuator to lift or lower the boom and the power control valve, and a check valve is along the feed branch to block flow from the actuator during boom lowering and to bypass power control valve during boom lifting.

4. The working vehicle according to claim 3, wherein a further flow restrictor is along the fluid line and the first pressure signal is branched from the fluid line via a second node between the power control valve and the further flow restrictor, and a line pressure signal branches from the fluid line opposite to the second node with respect to the further flow restrictor and acts on the pressure compensator concordantly with the second pressure signal against the first pressure signal.

5. The working vehicle according to claim 4, wherein the feed branch is connected to the fluid line opposite to the first node with respect to the further flow restrictor.

6. The working vehicle according to claim 1, wherein the pressure compensator is normally closed by a spring acting against the first pressure signal.

7. The working vehicle according to claim 1, further comprising a piloting valve for controlling downwards speed of the boom, the piloting valve comprising:
a first piloting duct for connection to cylinder line via the first node;
a piloting input opening to receive the second pressure signal; and
a second piloting duct to control the opening of the control valve and connected to the piloting input opening,
wherein the pressure compensator and the branch are attached between the second piloting duct and a discharge opening of the piloting valve,
wherein the piloting valve further comprises a piloting branch suitable for branching from the second piloting duct upstream of the branch, and
wherein the pressure compensator is connected to the first piloting duct and to the piloting branch such to progressively open and connect the branch to the discharge opening upon increasing of the first pressure signal.

8. The vehicle according to claim 1, wherein the actuator is linear and a piston side of the actuator is connected to a piston line; a regeneration bridge connects a third node of piston line to the fluid line for flow regeneration; a further power control valve intercepts the regeneration bridge; the first pressure signal branches from the regeneration bridge; and opening of the further control valve is piloted by a regeneration piloting pressure signal branched from the second pressure signal.

9. A method of providing a working vehicle having a hydraulic lifting boom with a circuit to control downwards speed of the boom, the circuit comprising:
a fluid line to deliver hydraulic fluid to a tank when the boom lowers;
a control valve intercepting the fluid line; and
a fluid piloting line connected to a user interface for piloting the control valve when the boom lowers;
the method comprising the steps of:
providing a pressure compensator to discharge the fluid piloting line via a branch; and
connecting the compensator:
a first pressure signal branched from the fluid line at the low pressure side of the control valve when lowering the lifting boom; and
a second pressure signal from the fluid piloting line;
so that the pressure compensator is piloted by the first pressure signal and by the second pressure signal so that, upon increasing of the first pressure signal during boom lowering, the branch is progressively connected to the tank for causing the control valve to progressively close, the pressure of the branch being decoupled from the pressure of the second pressure signal.

* * * * *